United States Patent
Lee et al.

(10) Patent No.: US 8,913,178 B2
(45) Date of Patent: Dec. 16, 2014

(54) CAMERA MODULE CAPABLE OF EASILY DISSIPATING HEAT GENERATED IN CAMERA MODULE

(71) Applicant: Samsung Electro-Mechanics Co., Ltd., Gyeonggi-do (KR)

(72) Inventors: Sang Jin Lee, Gyunggi-do (KR); Kyu Beom Cho, Gyunggi-do (KR); Ick Chan Sim, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 126 days.

(21) Appl. No.: 13/653,309

(22) Filed: Oct. 16, 2012

(65) Prior Publication Data
US 2013/0093947 A1    Apr. 18, 2013

(30) Foreign Application Priority Data

Oct. 17, 2011   (KR) .......................... 10-2011-0106023

(51) Int. Cl.
*H04N 5/222*   (2006.01)
*G03B 17/12*   (2006.01)
*G03B 17/55*   (2006.01)
*H04N 5/225*   (2006.01)

(52) U.S. Cl.
CPC ................ *G03B 17/12* (2013.01); *G03B 17/55* (2013.01); *H04N 5/2254* (2013.01); *H04N 5/2253* (2013.01)

USPC ......................................................... 348/373

(58) Field of Classification Search
None
See application file for complete search history.

(56) References Cited

U.S. PATENT DOCUMENTS

| | | | |
|---|---|---|---|
| 2003/0234886 A1* | 12/2003 | Cho et al. ...................... | 348/340 |
| 2005/0140968 A1* | 6/2005 | Lee et al. ...................... | 356/153 |
| 2010/0157137 A1* | 6/2010 | Imai et al. ...................... | 348/362 |
| 2011/0298925 A1* | 12/2011 | Inoue et al. ...................... | 348/148 |
| 2013/0093947 A1* | 4/2013 | Lee et al. ...................... | 348/374 |

FOREIGN PATENT DOCUMENTS

| | | |
|---|---|---|
| KR | 10-2010-0123010 | 11/2010 |
| KR | 10-2010-0126176 | 12/2010 |

OTHER PUBLICATIONS

Office Action dated Nov. 28, 2012 for related Korean Patent Application No. 10-2011-0106023 and its English summary.

* cited by examiner

*Primary Examiner* — Justin P Misleh
(74) *Attorney, Agent, or Firm* — Ladas & Parry, LLP (57) ABSTRACT

There is provided a camera module including a lens barrel, a housing, an IR filter, an image sensor, a circuit substrate, a shield can, a heat transfer member mounted in the image sensor to transfer heat generated from the image sensor, and a protective cover mounted between the housing and the shield can while surrounding the bottom of the heat transfer member and connecting the housing and the shield can.

10 Claims, 6 Drawing Sheets

CAMERA MODULE CAPABLE OF EASILY DISSIPATING HEAT GENERATED IN CAMERA MODULE

CROSS REFERENCE TO RELATED APPLICATION

This application claims the benefit of Korean Patent Application No. 10-2011-0106023, filed on Oct. 17, 2011, entitled "Camera Module", which is hereby incorporated by reference in its entirety into this application.

BACKGROUND OF THE INVENTION

1. Technical Field

The present invention relates to a camera module.

2. Description of the Related Art

As a camera module is gradually miniaturized and the number of pixels are increased, the number of patterns required to configure a circuit is increased.

When the number of patterns is increased, an extra space between the patterns in a small space through which the patterns pass is reduced and thus, heat is generated. In order to prevent the generated heat from affecting the camera module, the generated heat needs to be instantly dissipated. However, an interval between the patterns is narrow and thus, heat is generated from sensors before heat can be dissipated, thereby increasing the temperature of the camera module.

When heat is generated in the camera module, the generated heat is conducted to the whole module, such that the temperature of the camera module is increased. As a result, resolution is deteriorated or noise occurs, such that the camera module becomes defective.

The camera module according to the prior art has used heat dissipation materials such as ceramic or does not include a heat dissipation device. However, the ceramic material is expensive and therefore, is difficult to be used as a heating dissipation material.

SUMMARY OF THE INVENTION

The present invention has been made in an effort to provide a camera module capable of easily dissipating heat generated in the camera module.

According to a preferred embodiment of the present invention, there is provided a camera module, including: a lens barrel part in which a plurality of lenses are stacked; a housing surrounding an outer peripheral surface of the lens barrel part; an IR filter mounted on a bottom of the housing to remove a near-infrared wavelength; an image sensor mounted on a bottom of the IR filter to convert an external image into an electrical signal; a circuit substrate having an opening part accommodating the image sensor formed at a center thereof; a shield can surrounding an outside of the housing to shield an electromagnetic wave; a heat transfer member mounted in the image sensor to transfer heat generated from the image sensor; and a protective cover mounted between the housing and the shield can while surrounding the bottom of the heat transfer member and connecting the housing and the shield can.

The circuit substrate may be a flex PCB.

At least one side of the protective cover may be provided with an embossing part.

The protective cover may have an L shape that is formed with a side and a bottom and be press-fitted between the housing and the shield can.

The protective cover may be made of a heat conductive material.

The protective cover may be provided with an assembling member so as to be assembled with the housing.

The housing may be provided with an assembling groove so as to be assembled with the protective cover.

A heat transfer member for blocking the heat generated from the image sensor may be applied between the image sensor and the protective cover.

The assembling member may have a hook shape.

DESCRIPTION OF THE PREFERRED EMBODIMENTS

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Further, when it is determined that the detailed description of the known art related to the present invention may obscure the gist of the present invention, the detailed description thereof will be omitted.

Hereinafter, preferred embodiments of the present invention will be described in detail with reference to the accompanying drawings.

Figure 1:
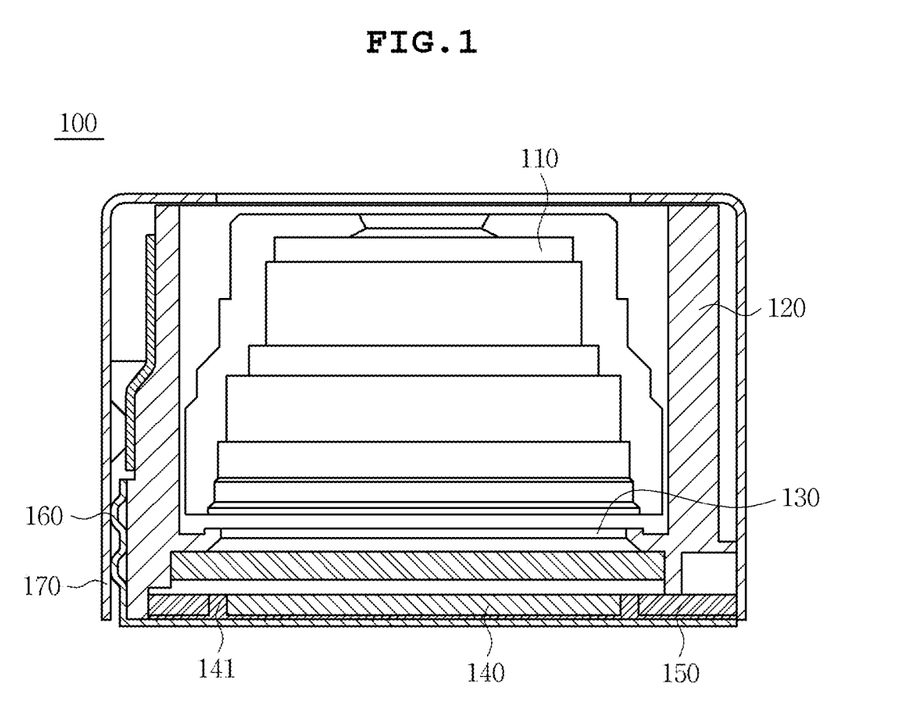
FIG. 1 is a cross-sectional view of a whole camera module according to a preferred embodiment of the present invention.
Figure 2:
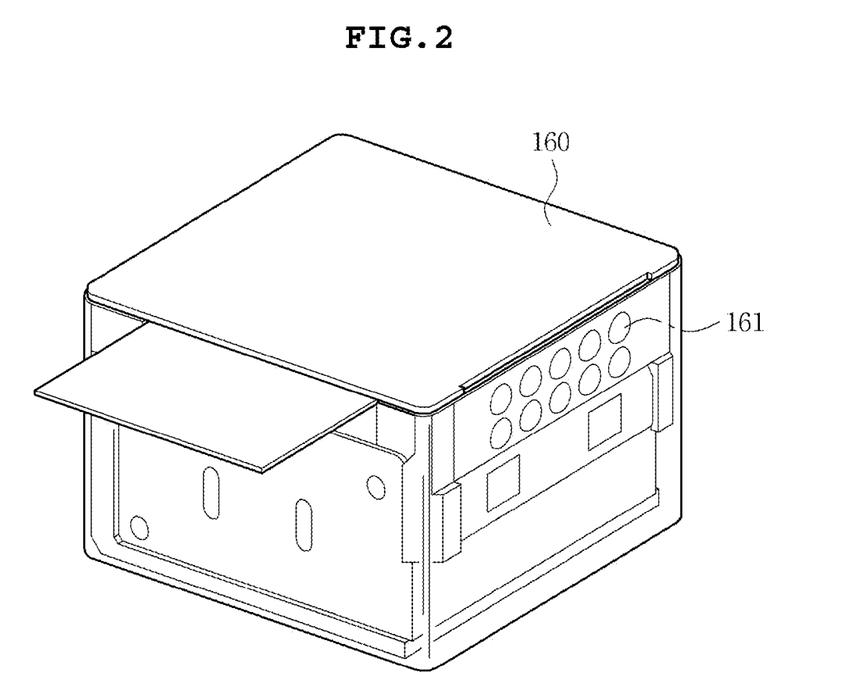
FIG. 2 is a bottom enlarged view of the camera module according to the preferred embodiment of the present invention.
Figure 3:
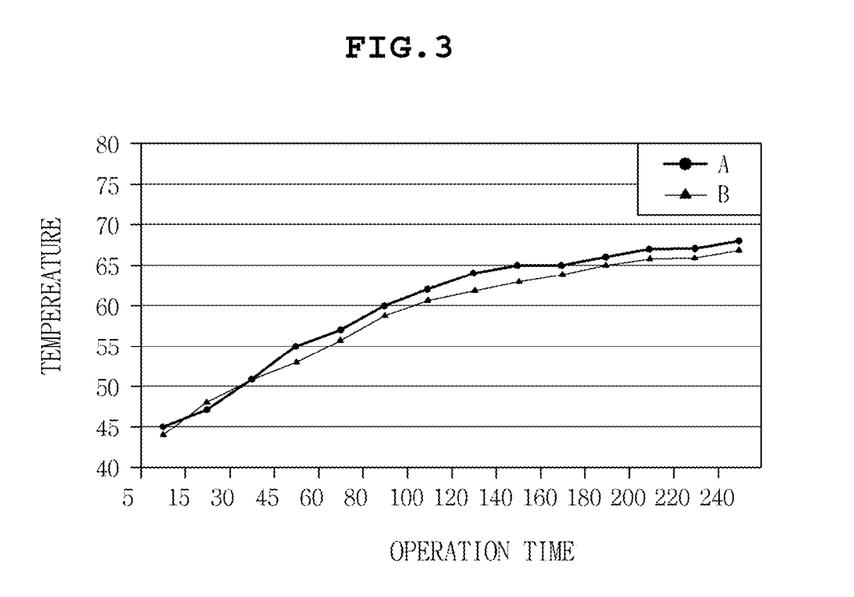
FIG. 3 is a graph of the camera module according to the preferred embodiment of the present invention.

FIG. 1 is a cross-sectional view of a whole camera module according to a preferred embodiment of the present invention, FIG. 2 is a bottom enlarged view of the camera module according to the preferred embodiment of the present invention, and FIG. 3 is a graph of the camera module according to the preferred embodiment of the present invention.

Figure 4:
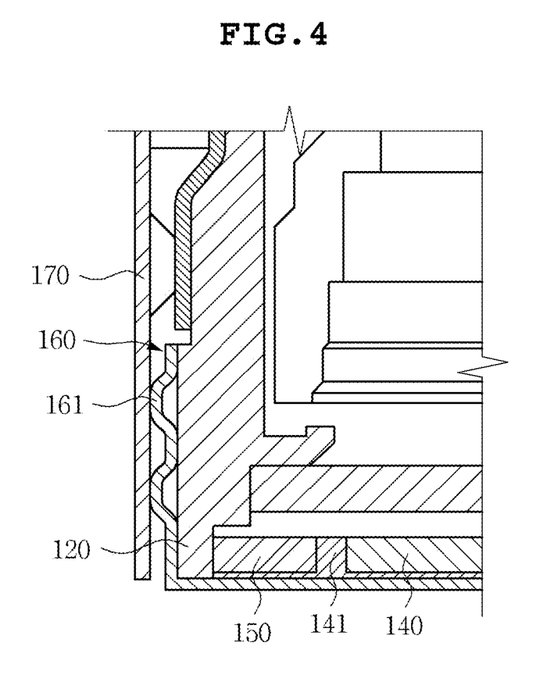
FIG. 4 is a partially enlarged view of the camera module according to the preferred embodiment of the present invention.
Figure 5:
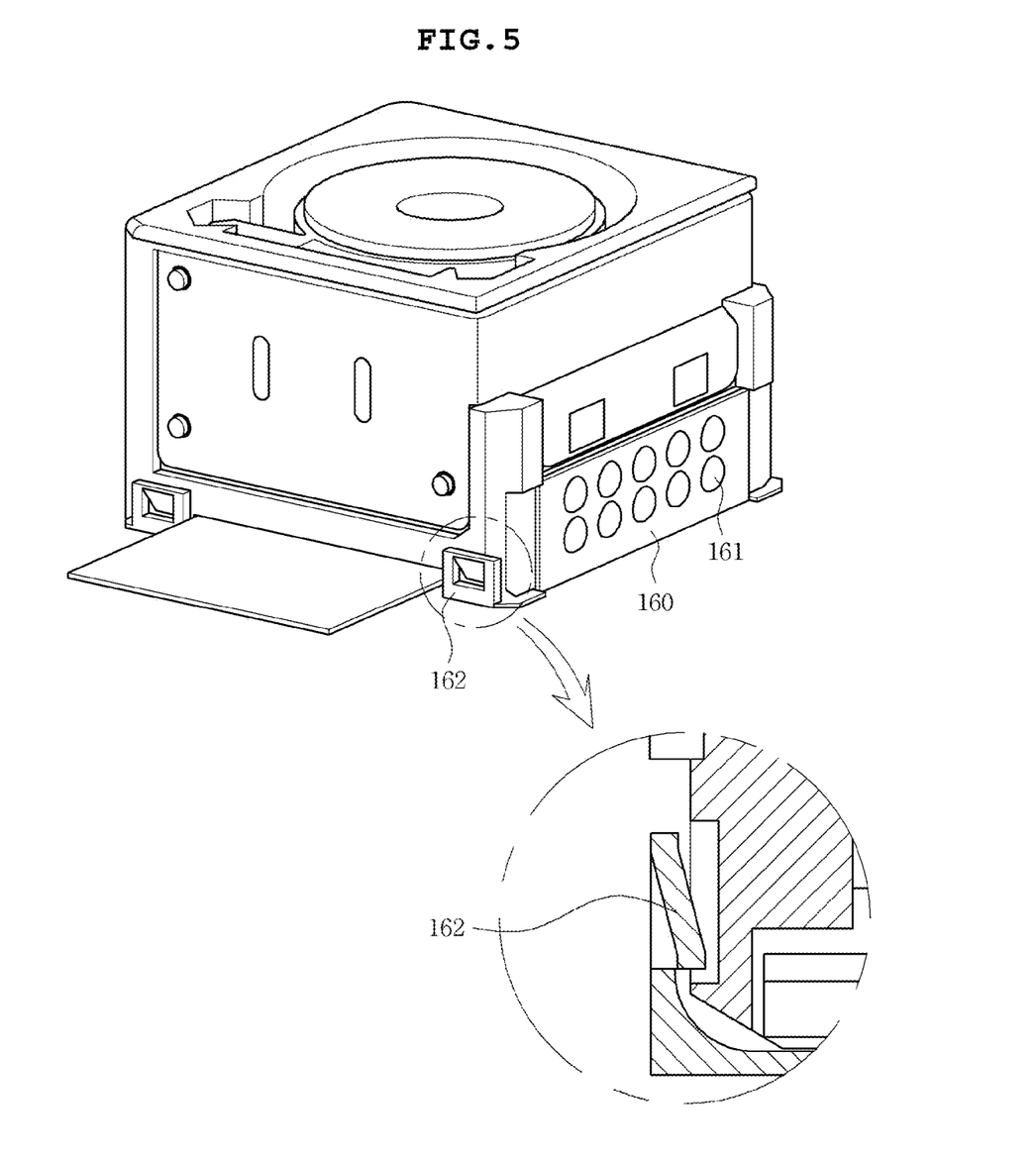
FIG. 5 is a perspective view of a camera module according to the preferred embodiment of the present invention.
Figure 6:
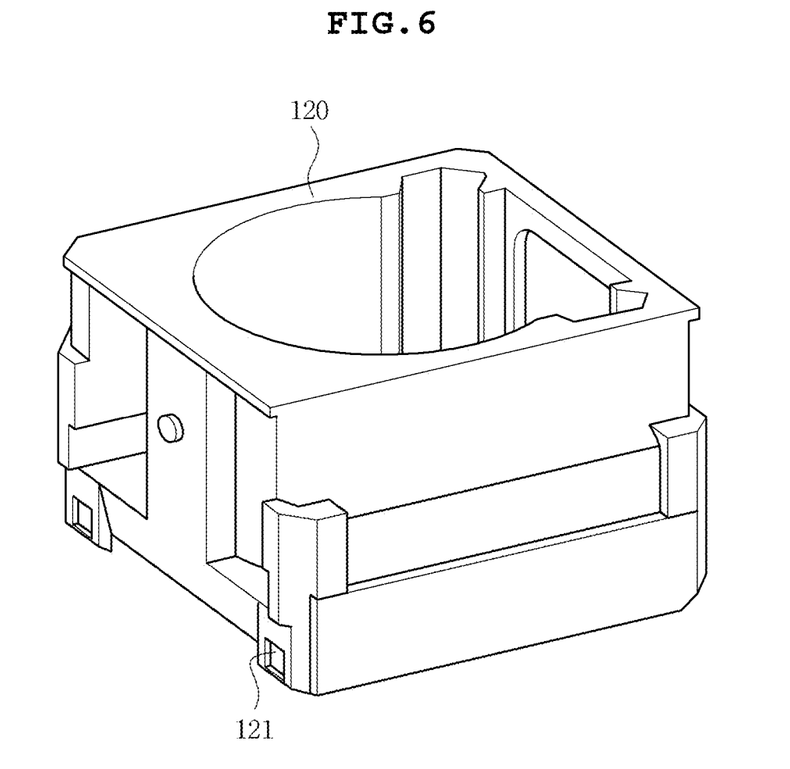
FIGS. 6 and 7 are partially enlarged views of the camera module according to the preferred embodiment of the present invention.
Figure 7:
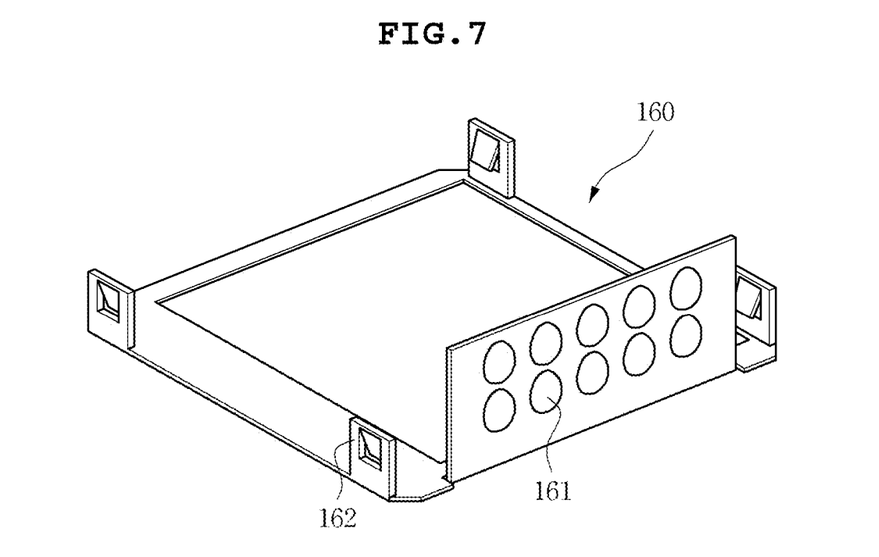

FIG. 4 is a partially enlarged view of the camera module according to the preferred embodiment of the present invention, FIG. 5 is a perspective view of a camera module according to the preferred embodiment of the present invention, and FIGS. 6 and 7 are partially enlarged views of the camera module according to the preferred embodiment of the present invention.

Figure 8:
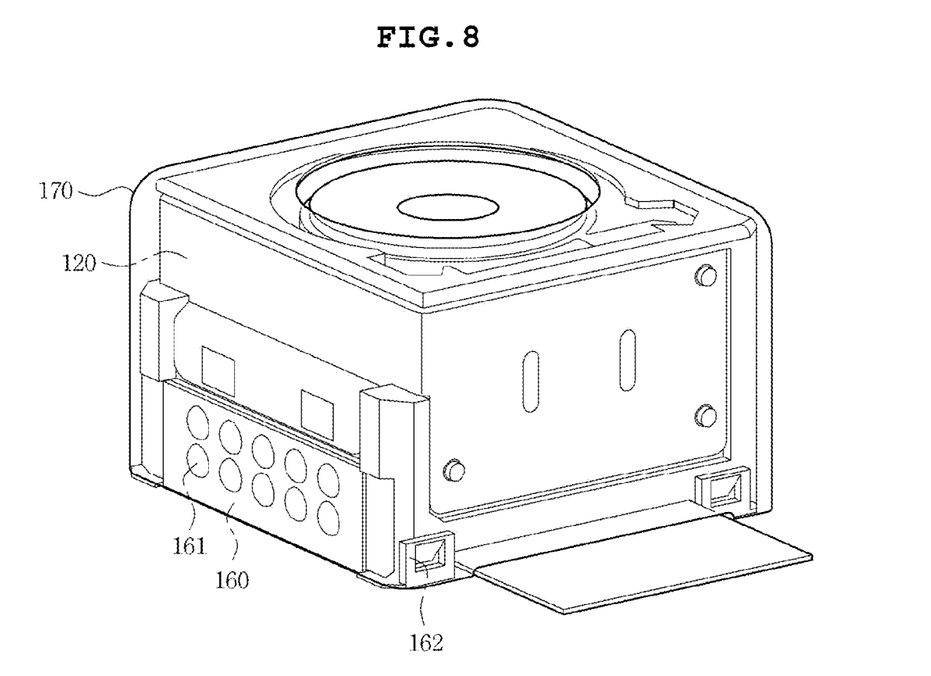
FIG. 8 is a whole perspective view of the camera module according to the preferred embodiment of the present invention.
Figure 9:
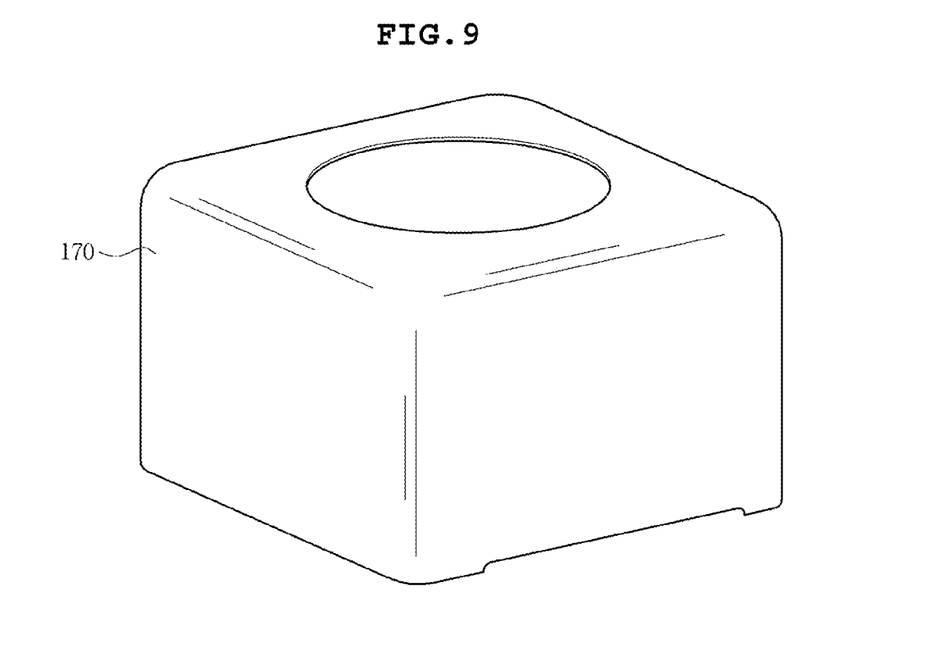
FIG. 9 is a partially perspective view of the camera module according to the preferred embodiment of the present invention.

FIG. 8 is a whole perspective view of the camera module according to the preferred embodiment of the present invention and FIG. 9 is a partially perspective view of the camera module according to the preferred embodiment of the present invention.

As shown in FIG. 1, a camera module 100 according to a preferred embodiment of the present invention includes a lens barrel part 110, a housing 120, an IR filter 130, an image sensor 140, a circuit substrate 150, a protective cover 160, and a shield can 170.

The lens barrel part 110 is configured of a plurality of lens embedded therein, concentrates images of a subject for photography on the image sensor 140 in the camera module 100, and is screw-coupled to the housing 120 by a screw thread formed on an outer peripheral surface thereof.

The housing 120 supports the entire lens barrel part 110 to protect the lens barrel part 110 from the outside and is fixedly coupled to the circuit substrate 150 to protect components such as the IR filter 130 mounted on the top of the circuit substrate 150.

Here, an inner peripheral surface of the housing 120 to which the lens barrel part 110 coupled is provided with a screw groove engaged with the screw thread of the lens barrel part 110.

The IR-cut filter 130 is required in order to remove wavelengths in a near infrared range. More specifically, a camera of a camera phone generates an image by converting optical signals into electric signals using a charged coupled device (CCD) or a complementary metal oxide semiconductor (CMOS). These optical signals may be sensed in a near infrared region (700 to 1150 nm) as well as in a visible region (400 to 700 nm) that may be viewed by an eye of a person, such that a sensor is saturated with signals unrelated to an actual color or image. Therefore, the IR-cut filter is required to remove the wavelengths in a near infrared range.

The image sensor 140 coverts and stores external images into electrical signals and is inserted into the circuit substrate 150 and stores the external images instead of the existing film. The image sensor 140 may be divided into a charged coupled device (CCD) image sensor and a CMOS image sensor (CIS). The CCD image sensor uses a charge coupled device. In addition, the CIS uses a complementary metal oxide semiconductor.

The CCD image sensor directly transmits a signal in an electron form, and the CIS transfers a signal in a voltage form. When the signal is transferred in the voltage form, the possibility that noise generated during a process of transferring the voltage signal or introduced from the outside will be mixed with the voltage signal to be introduced thereinto is high Therefore, the CCD image sensor using the electron signal is more robust to noise as compared to the CIS.

A ratio of an area occupied by a light receiving part in an area of one pixel is called a fill factor. Since a large amount of light may be received with respect to the same incident light as an area of the light receiving part becomes large, when the area of the light receiving part increases, the number of generated electrons also increases.

That is, the number of electronics used as the signal increases, such that sensitivity is improved and a magnitude of the signal becomes larger than noise, thereby being robust to the noise. Since the CIS includes a pixel for converting the electron into the voltage in a pixel, it has a fill factor lower than that of CCD image sensor. This indicates that the CCD image sensor is more excellent than the CIS in view of an image quality.

The CCD image sensor has a fill factor higher than that of the CIS and uses the electron as the signal to be robust to the noise. However, in the CCD image sensor, since a CMOS process that is currently used mainly may not be used and surrounding circuit parts may not be implemented on a chip, a manufacturing cost is increased and integration is decreased. In addition, the CCD image sensor uses a large amount of voltage, thereby consuming a large amount of power. On the other hand, the CIS drives the circuit using a single voltage and uses the CMOS, thereby making it possible to reduce power consumption.

The circuit substrate 150 is mounted at the bottom of the housing 120 and includes an electrical circuit or various passive elements and integration circuits mounted on the top thereof in order to transceive electrical signals.

The circuit substrate 150 has the opening part formed at the center thereof and the opening part is mounted with the image sensor 140. According to the prior art, the image sensor is mounted on the top of the circuit substrate 150. However, according to the preferred embodiment of the present invention, the image sensor 140 is mounted in the opening part 151 formed at the center of the circuit substrate 150, such that the entire height of the camera module is reduced.

That is, since a total track length (TTL) (a distance from an upper end of the lens barrel part to an upper end of the image sensor) determining the entire height of the camera module is constant according to a pixel and a kind of camera, a scheme of reducing a length of the camera module without having an effect on the TTL is required.

Here, since the entire length of the camera module may be reduced when the length from an upper end of the image sensor 140 to a lower end of the circuit substrate 150 is reduced, the image sensor 140 is mounted in the central opening part of the circuit substrate 150, thereby making it possible to significantly contribute to reducing the entire length of the camera module.

The circuit substrate 150 according to the preferred embodiment of the present invention is a flex PCB and therefore, easily dissipates the heat of the camera module to degrade the temperature. The circuit substrate 150 replaces the expensive ceramic PCB with the degraded workability and therefore, can greatly save costs.

The protective cover 160 covers an outside of the lens barrel part 110 and moves heat generated from the image sensor 140 to the shield can 170 through the protective cover 160.

The protective cover 160 is provided with an embossing part (not shown) so as to be connected with the shield can and the heat generated from the image sensor 140 is transferred to the protective cover 160 and the shield can 170 through a heat transfer member 141.

The detailed shape and features of the protective cover 160 will be described in detail below with reference to the drawings.

The shield can 170 is shields an electromagnetic wave and an EMI to surround the outside of the protective cover 160. Since the shield can 170 does not surround the whole module, heat can be easily dissipated, such that the heat generated from the image sensor 140 can be easily dissipated to the outside.

Further, a heat transfer member 141 is applied between the image sensor 140 and the protective cover 160 so as to facilitate the transfer of generated heat. The heat transfer member 141 may be made of heat conductive materials for facilitating heat transfer, for example, copper, and the like.

FIG. 2 is a bottom enlarged view of the camera module according to the preferred embodiment of the present invention. FIG. 2 shows a case in which the bottom of the module is provided with the protective cover 160.

The protective cover 160 is mounted in an L shape under the module and press-fitted between the housing 120 and the shield can 170. The protective cover 160 contacts the shield can 170, the housing 120, and the heat transfer member 141 of the image sensor 140 and is provided with the embossing part 161 that facilitates the heat transfer.

The protective cover 160 may be made of excellent heat conductive materials, in particular, copper. The shape of the embossing part 161 of the protective cover 160 is not limited. Therefore, the contact surface between the embossing part 161 and the shield can 170 may be diversified by changing the shape of the embossing part 161, which provides an advantageous structure in dissipating heat.

FIG. 3 is a graph showing a temperature change by comparing the camera module according to the preferred embodiment of the present invention as described above with the camera module according to the prior art.

As shown in FIG. 3, it can be appreciated that a temperature change A dissipated when the circuit substrate 150 of the camera module according to the preferred embodiment of the present invention is provided as the flexible PCB and the protective cover 160 is provided may be similar to a temperature change B dissipated when the circuit substrate of the camera module according to the prior art is a ceramic substrate.

Therefore, the camera module according to the preferred embodiment of the present invention is similar to a heat dissipation function of the camera module according to the prior art using the expensive ceramic substrate and therefore, may exhibit the same heat dissipation effect without using the expensive ceramic substrate.

FIG. 4 is a partially enlarged view of the camera module according to the preferred embodiment of the present invention. It can be appreciated that the embossing part 161 of the protective cover 160 contacts between the housing 120 and the shield can 170 and therefore, has a structure suitable to transfer heat generated in the camera module to the shield can and dissipate the heat to the outside.

In addition, the heat transfer member 141 is mounted between the image sensor 140 and the protective cover 160 to facilitate the conduction of heat.

FIG. 5 is a perspective view of a camera module according to the preferred embodiment of the present invention. In this case, it can be appreciated from FIG. 5 that the protective cover 160 is mounted on an outer peripheral surface of the housing 120. The protective cover 160 has an L shape and is provided with the embossing part 161 having a protruding portion that facilitates the contact with shield can (not shown) mounted on the outside thereof. The embossing part 161 may be formed with one surface of the housing and may be formed to completely surround four surfaces of the housing.

In addition, the protective cover 160 is provided with an assembling member 162 so as to be assembled with the housing 120. A shape of the assembling member 162 is not limited, but the assembling member 162 may have a hook shape inclined downwardly and is fastened with the outside of the housing 120.

At least one assembling member 162 may be formed at corner portions of the protective cover 160.

FIG. 6 is an enlarged view of the housing 120 of the camera module according to the preferred embodiment of the present invention. In this case, the inside of the housing 120 is provided with an empty space and thus, may be provided with the lens barrel part (not shown) and the outer peripheral surface of the housing 120 is provided with the protective cover (not shown).

The outer peripheral surface of the housing 120 is provided with an assembling groove 121 with which the assembling member 162 is fastened. The shape of the assembling groove 121 has a shape corresponding to the assembling member 162 and thus, the assembling groove 121 may be assembled with the assembling member 162 and the number and the position of the assembling groove 121 correspond to the number and the position of the assembling member 162.

FIG. 7 is an enlarged view of the protective cover 160 of the camera module according to the preferred embodiment of the present invention. The protective cover 160 is provided with the embossing part 161, which is advantageous in the contact between the housing 120 and the shield can 170 to facilitate the heat emission.

At least one side of the protective cover 160 provided with the embossing part 161 of the protective cover 160 may also be provided.

FIG. 8 is a whole perspective view of the camera module according to the preferred embodiment of the present invention. FIG. 8 shows the case in which the housing 120 and the protective cover 160 are assembled by the assembling member 162 when the outside of the housing 120 is provided with the protective cover 160.

The assembling member 162 may be formed by extending a portion of the protective cover 160 but the shape of the assembling member 162 may be variously implemented and may be implemented in a hook shape. At least one assembling member 162 is mounted at corner portions of the protective cover 160.

After the housing 120 is mounted with the protective cover 160, the outer peripheral surface of the housing 120 is mounted with the shield can 170 to shield the electromagnetic wave and the EMI.

FIG. 9 is a partially perspective view of the shield can 170 of the camera module according to the preferred embodiment of the present invention. In this case, the shape of the shield can 170 corresponds to the shape of the housing 120 but preferably, may be a cubic shape.

The shield can 170 serves to dissipate heat transferred from the protective cover 160 to the outside and shield the electromagnetic wave and the EMI. In this case, the shield can 170 has the opened bottom surface, and the like, and therefore, does not surround the whole module, thereby easily dissipating heat. Therefore, the heat emission generated from the image sensor 140 is facilitated.

The camera module 100 according to the preferred embodiment of the present invention having the above-mentioned structure is provided with the protective cover 160 having the embossing formed between the housing 120 and the shield can 170, thereby easily and rapidly dissipating the heat generated from the image sensor 140 to the shield can 170 and to the outside.

The structure can greatly reduce the costs of product by not using the expensive ceramic PCB with degraded workability so as to dissipate the heat generated in the camera module according to the prior art.

In addition, the preferred embodiments of the present invention can rapidly dissipate the heat from the camera module to prevent the heat generated from the sensor from being transferred to the whole module, thereby increasing the resolution of the camera module and preventing the defects of the camera module from occurring by reducing noises.

Further, since the image sensor 140 is included in the circuit substrate 150, the preferred embodiments of the present invention can reduce the height of the whole module and miniaturize the module.

The camera module according to the preferred embodiments of the present invention can easily and rapidly dissipate heat generated from the image sensor to the shield can and to the outside by forming the protective cover having embossing formed between the housing and the shield can.

The structure can greatly reduce the costs of product by not using the expensive ceramic PCB with degraded workability so as to dissipate the heat generated in the camera module according to the prior art.

In addition, the preferred embodiments of the present invention rapidly dissipate the heat from the camera module to prevent the heat generated from the sensor from being transferred to the whole module, thereby increasing the resolution of the camera module and preventing the defects of the camera module from occurring by reducing noises.

Further, since the image sensors are included in the circuit substrate, the preferred embodiments of the present invention can reduce the height of the whole module and miniaturize the module.

Although the embodiment of the present invention has been disclosed for illustrative purposes, it will be appreciated that a camera module according to the invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A camera module, comprising:
   a lens barrel part in which a plurality of lenses are stacked;
   a circuit substrate facing the lens barrel part;
   an image sensor connected to the circuit substrate;
   a shield can surrounding an outside of the lens barrel to shield an electromagnetic wave, and being an outermost of the camera module;
   a heat transfer member connected to the image sensor to transfer heat generated from the image sensor; and
   a protective cover connected to the heat transfer member and the shield can and transferring the heat of the image sensor to the shield can.

2. The camera module as set forth in claim 1, wherein the circuit substrate is a flex PCB.

3. The camera module as set forth in claim 1, wherein at least one side of the protective cover is provided with an embossing part.

4. The camera module as set forth in claim 1, wherein the protective cover has an L shape that is formed with a side and a bottom and is press-fitted between the housing and the shield can.

5. The camera module as set forth in claim 1, wherein the protective cover is made of a heat conductive material.

6. The camera module as set forth in claim 1, wherein the protective cover is provided with an assembling member so as to be assembled with the housing.

7. The camera module as set forth in claim 1, wherein the housing is provided with an assembling groove so as to be assembled with the protective cover.

8. The camera module as set forth in claim 6, wherein the assembling member has a hook shape.

9. The camera module as set forth in claim 1, further comprising:
   a housing surrounding an outer peripheral surface of the lens barrel part;
   an IR filter mounted on a bottom of the housing to remove a near-infrared wavelength;
   the circuit substrate having an opening part accommodating the image sensor formed at a center thereof;
   the image sensor mounted on the opening part bottom of the circuit substrate; and
   the shield can surrounding an outside of the housing.

10. The camera module as set forth in claim 1, wherein the heat transfer member surrounding a side and a bottom of the image sensor.

* * * * *